United States Patent [19]

Nelson et al.

[11] Patent Number: 5,445,223

[45] Date of Patent: Aug. 29, 1995

[54] DELAYED BORATE CROSSLINKED FRACTURING FLUID HAVING INCREASED TEMPERATURE RANGE

[75] Inventors: Erik B. Nelson, Broken Arrow, Okla.; Kay E. Cawiezel, Longview, Tex.; Vernon G. Constien, Sperry, Okla.

[73] Assignee: Dowell, a division of Schlumberger Technology Corporation, Houston, Tex.

[21] Appl. No.: 213,640

[22] Filed: Mar. 15, 1994

[51] Int. Cl.⁶ .................................. E21B 43/267
[52] U.S. Cl. ............................ 166/308; 166/300; 507/266; 507/273; 507/922; 507/924
[58] Field of Search ................. 166/300, 308; 252/8.551; 507/266, 273, 922, 924

[56] References Cited

U.S. PATENT DOCUMENTS

| | | | |
|---|---|---|---|
| 4,464,270 | 8/1984 | Hollenbeak et al. | 166/308 X |
| 4,619,776 | 10/1986 | Monshine | 166/308 X |
| 5,089,149 | 2/1992 | Ridland et al. | 166/308 X |
| 5,103,905 | 4/1992 | Brannon et al. | 166/308 X |
| 5,164,009 | 11/1992 | Gupta et al. | 166/308 X |
| 5,226,481 | 7/1993 | Le et al. | 166/308 X |
| 5,259,455 | 11/1993 | Nimerick et al. | 166/308 |

*Primary Examiner*—George A. Suchfield
*Attorney, Agent, or Firm*—John E. Vick, Jr.

[57] ABSTRACT

The crosslinking of galactomannan gum fracturing fluids by borate ion is delayed for high-temperature applications by encapsulating the boron with a polymer coating. The crosslink-delay time is further adjusted by varying the concentration of an organic polyol. The polyol also acts as a stabilizer for the crosslinked fluid at elevated temperatures. Low pumping friction pressures are achieved by the delay in the crosslinking with the boron available at high temperatures to add high temperature stability to the fracturing fluid at temperatures ranging up to about 350° F.

5 Claims, No Drawings

DELAYED BORATE CROSSLINKED FRACTURING FLUID HAVING INCREASED TEMPERATURE RANGE

This invention relates to the art of recovery of hydrocarbon fluids from subterranean formations, and particularly, to a fracturing process and fluid used in such fracturing process.

BACKGROUND OF THE INVENTION

In the art of recovering hydrocarbon values from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a water- or oil-base fluid incorporating a polymeric thickening agent. The polymeric thickening agent helps to control leak-off of the fracturing fluid into the formation, aids in the transfer of hydraulic fracturing pressure to the rock surfaces and, primarily, permits the suspension of particulate proppant materials which remain in place within the fracture when fracturing pressure is released.

Typical polymeric thickening agents for use in fracturing fluids comprise galactomannan gums such as guar and substituted guars such as hydroxypropyl guar or carboxymethylhydroxypropyl guar. Cellulosic polymers such as hydroxyethyl cellulose may also be used as well as synthetic polymers such as polyacrylamide. To increase the viscosity and, thus, the proppant carrying capacity as well as to increase the high-temperature stability of the fracturing fluid and to decrease fluid loss to the formation, crosslinking of the polymers is also commonly practiced. Typical crosslinking agents comprise soluble boron, zirconium or titanium compounds. These metal ions provide for crosslinking or tying together of the polymer chains to increase the viscosity and improve the rheology of the fracturing fluid.

Of necessity, fracturing fluids are prepared on the surface and then pumped through tubing in the wellbore to the hydrocarbon-bearing subterranean formation. While high viscosity is a desirable characteristic of a fluid within the formation in order to efficiently transfer fracturing pressures to the rock as well as to reduce fluid leak-off, large amounts of hydraulic horsepower are required to pump such high viscosity fluids through the well tubing to the formation. In order to reduce the friction pressure, various methods of delaying the crosslinking of the polymers in a fracturing fluid have been developed. This allows the pumping of a relatively less viscous fracturing fluid having relatively low friction pressures within the well tubing with crosslinking being effected at or near the subterranean formation so that the advantageous properties of the thickened crosslinked fluid are available at the rock face.

One typical delayed crosslinking fracturing fluid system comprises borate crosslinked galactomannan gums such as guar or hydroxypropyl guar (HPG). The galactomannan polymers are generally provided to a blender in solid, powder form, or more typically, suspended in a hydrocarbon such as kerosene or diesel. When added to a neutral or acidic aqueous solution, the galactomannan gum hydrates to form a gel. Hydration of guar and HPG will only take place under neutral or acidic conditions, that is, at a pH of about 7 or less. Under these pH conditions, no crosslinking of guar of HPG will occur with borate ion. In order to effect borate crosslinking of guar and HPG, the pH must be raided to at least 9.5. It is this raising of the pH requirement which has been exploited in the prior art to effect a delay in the crosslinking of galactomannan gums by borate ion.

One typical mechanism for delaying the elevation of the pH is to use a low solubility base such as magnesium oxide (MgO). MgO is added to the hydrated, acidic galactomannan gum solution along with a boron releasing compound. Since the solution is initially acidic, there is no crosslinking of the polymers effected by the presence of boron (or borate ion) in solution. As the MgO slowly solubilizes in the system, the pH is gradually raised according to reaction (1).

(1) $MgO + H_2O \rightarrow Mg^{2+} + 2OH^-$

It has also been suggested that the solubilization of the MgO be further delayed by dispersing solid particulate MgO in hydrocarbon droplets with a surfactant which further slows the solubilization of the MgO. The borate crosslinking of a galactomannan gum is, however, a reversible reaction should the pH of the solution drop below the required pH of about 9.5 over a period of time. At temperatures of above about 200° F., magnesium ion combines with hydroxide ion to produce insoluble magnesium hydroxide which causes a lowering of the pH of the fracturing fluid, and which in turn, destabilizes the fluid through breaking of the borate crosslink. Thus, the use of borate crosslinked galactomannan gums in fracturing high temperature formations above about 200° F. is limited by the high pumping friction pressures required to pump a stable non-delayed borate crosslinked fluid. The advantages of good clean up and removal of borate crosslinked galactomannan gums as well as their lower cost cannot be effectively employed above these temperatures.

Methods have been developed through which delayed borate-crosslinked fluids may be applied to fracture high temperature formations above 200° F. One method employs a polyol borate chelant selected from a group consisting of glycols, glycerol, polyhydroxy saccharides and polysaccharides and acid, acid salt, ester and amine derivatives of such saccharides and polysaccharides. The borate is chelated prior to its exposure to guar; as a result, when added to a linear guar gel, there is a delay before sufficient borate is released from the chelate to effect crosslinking. This method is practical up to temperatures approaching 300° F. At such high temperatures it is necessary to increase the borate and hydroxide concentrations significantly, owing to pH and solubility of the $B(OH)_4^-$ species. Accordingly, it is necessary to increase the borate-chelant concentration. Frequently the additional chelant in the system interferes with the stability of the fluid, with a resulting loss of viscosity.

The high-temperature stability of borate-crosslinked guar fluids is strongly influenced by the presence of a polyol species such as gluconate. Apparently, there is a minimum amount of polyol chelant which is required for fluid stability at high temperatures; however, very high amounts of the polyol have a destabilizing effect. It is often assumed that the crosslinked species in borate-crosslinked guar fluids are 1:1 or 2:1 complexes of boron and guar. The behavior of fluids containing a polyol such as gluconate suggests the possible existence of a $R_1$-B-$R_2$ complex, where $R_1$ is guar and $R_2$ is gluconate.

Another method of delaying crosslinking at high temperatures involves the addition of slowly soluble boron compounds in place of boric acid, or "matrix particles" of a borate compound combined with an inert agent that interferes with borate dissolution. This method is frequently problematic for two reasons. First, when borate is released slowly from a particle, a layer of crosslinked guar can form around the particle interfering with prompt borate diffusion throughout the fluid. As a result, the fluid is not homogeneous. Second, to achieve a given delay, it is often necessary to add more total borate than is required. Consequently, the fluid may ultimately become overcrosslinked and syneresis would be observed.

SUMMARY OF THE INVENTION

The present invention provides a fracturing fluid and method of fracturing which allows the delay of borate crosslinking of a galactomannan gum fracturing fluid for use at temperatures well above the former 200° F. temperature limitation of prior art systems.

In accordance with the invention, a fracturing fluid for fracturing subterranean formations comprises an aqueous hydrated galactomannan gum solution, one or more organic polyol complexing agents selected from a group consisting of glycols, glycerol, polyhydroxy saccharides and polysaccharides and acid, acid salt, ester and amine derivatives of such saccharides and polysaccharides and an encapsulated borate crosslinking agent.

Still further in accordance with the invention, a method of delaying boron crosslinking of an aqueous hydrated galactomannan gum fracturing fluid comprises the steps of providing an aqueous hydrated galactomannan gum fluid and adding a mixture of an encapsulated boron-containing compound, an organic polyol complexing agent and a base whereby the boron-crosslinking of the galactomannan gum is effected following a delay in release of the boron from the encapsulating coating.

Still further in accordance with the invention, a method of fracturing a subterranean formation comprises the steps of providing a hydrated galactomannan gum in aqueous solution, adding a crosslinking agent comprising an encapsulated borate compound and an alkaline solution of a polyol, and pumping the combined materials through well tubing to a subterranean formation at fracturing pressures.

It is therefore an object of this invention to provide a method for delaying the borate crosslinking of a galactomannan gum which is less affected by elevated subterranean temperatures.

It is yet another object of this invention to provide a fracturing fluid and method of fracturing which allows the use of borate crosslinked galactomannan gums at temperatures above 200° F., and particularly at temperatures above 250° F.

DETAILED DESCRIPTION OF THE PREFERRED EMBODIMENTS

The invention will now be more fully described in the more limited aspects of preferred embodiments thereof including a number of examples which should be considered only as illustrative of the concept of the invention. It will be understood that such description and examples do not in any way limit the scope of the invention described.

In accordance with the invention, the crosslinking of a galactomannan gum with borate ion is delayed by encapsulating the boron within a polymeric coating. The chemical nature of the coating may be chosen from several classes such as celluloses, acrylates, styrene/butadienes, polyvinylidene chlorides, etc. The preferred coating has a high solubility in, or is destabilized by, the fracturing-fluid environment, and is chemically compatible with all components of the fracturing fluid. The melting point of the coating should exceed 150° F. For practical applications, the concentration of coating on the particle should not exceed 25 percent by weight. The size of the solid borate granules prior to encapsulation is preferably approximately 20/40 mesh or smaller. In addition to the soluble borate, the encapsulated particle may optionally contain a filler or inert material. The most suitable coating technique is a fluidized bed coating process such as the Wurster Process, where particles are spray coated while suspended in an upwardly moving air stream.

At a given coating thickness or concentration, the crosslink delay is further controlled by an aqueous alkaline solution comprising an organic polyol in accordance with the equilibrium reactions (2) and (3) below.

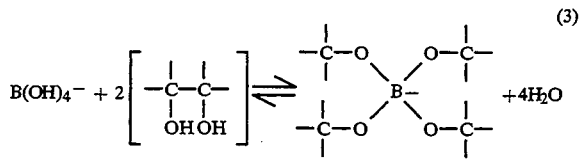

As used in this specification, the term "polyol" will be understood to mean an organic compound having adjacent alcohol functions as set forth in (4) below.

Thus, a polyol may comprise such materials as glycols, glycerin, saccharides such as glucose, sorbitol, dextrose, mannose, mannitol and the like as well as other carbohydrates and polysaccharides including natural and synthetic gums. Also included in the term "polyol" are acid, acid salt, ester and amine derivatives of a polyol. Glucose and its salts are especially preferred.

The aforementioned polyol species have been used previously as the sole delay agents for borate-crosslinked galactomannan gums. The present invention employs the polyol in a dual role–first, as a method for fine-tuning the crosslink delay; and second, as a high-temperature fluid stabilizer. It has been found that a minimum concentration of the polyol must be present to obtain a stable fluid at high temperatures. These points will be illustrated in the forthcoming examples.

It is contemplated within the scope of the invention that the encapsulated borate be added to an aqueous solution containing hydrated galactomannan gum, the pH adjusting base and the polyol. Note that, unlike previously disclosed inventions, the borate is not prechelated before addition to the hydrated galactomannan gum. In a preferred embodiment, a continuous-mix or "on-the-fly" mixing procedure is followed wherein the galactomannan gum is supplied to the makeup water such as fresh water, brine or sea water and is passed through a continuous mixer allowing sufficient residence time for substantially complete hydration of the galactomannan gum, followed by the addition of the pH-adjusting agent and polyol. Finally, the solid encapsulated borate compound is metered into the fluid as described above. The fracturing fluid is then in a condition to be pumped into the wellbore to the formation to be fractured either as a pad or with the addition of proppant material in normal loadings up to sixteen or more pounds of proppant per gallon of fracturing fluid.

The solid encapsulated borate compound may be added to the fluid in a variety of ways. In addition to the method described in the previous paragraph, it may be added as a slurry of the encapsulated borate in an organic solvent such as diesel oil. It may also be mixed with other solids (such as breakers or proppant) prior to addition to the fluid. Other modifications will be apparent to those skilled in the art.

Delay of the crosslinking reaction and maintaining viscosity at temperature are important parameters in selecting an acceptable fracturing fluid formulation. The delay system should delay crosslinking of the galactomannan gum for the period of time required to pump the fluid from the point of addtion of the crosslinking additive until it reaches or enters into the subterranean after traversing the tubing string from the surface. Generally, a delay of three to fifteen minutes is acceptable. Additionally, the crosslinking system must maintain its viscosity at the temperature of the subterranean formation in order to transport the suspended proppant within the fracture. Generally, the viscosity must remain above one hundred centipoise, preferably higher, through the completion of the pumping process.

The following examples illustrate the fundamental differences between the present invention and previously disclosed technology, and several preferred embodiments of the invention.

EXAMPLE 1

A base fracturing fluid comprising fifty pounds of guar per one thousand gallons of fracturing fluid was prepared and was allowed to hydrate. The fracturing fluid contained minor amounts of common, nonactive (from the standpoint of crosslinking activity) fracturing fluid additives such as a surfactant, a biocide and a defoamer. The fluid also contained an iron-control agent and an oxygen scavenger to inhibit high-temperature polymer degradation.

To this base fluid, 12.5 pounds of boric acid and 20 pounds of sodium hydroxide per thousand gallons of base fluid were mixed together and then added to the base fluid. Crosslinking of the guar was effected in a period of approximately 10 to 15 seconds. The crosslinked fluid was heated to 300° F. in a Fann 50 high-temperature rheometer. By the time the target temperature was attained (approximately 30 minutes), the crosslinked-fluid viscosity had fallen to less than five centipoises (measured at 40 sec$^{-1}$).

EXAMPLE 2

To the base fluid of Example 1, 20 pounds of sodium hydroxide per thousand gallons of base fluid were added. Next, 12.5 pounds of boric acid encapsulated with three percent (by weight) "ETHOCEL" ED ethylcellulose available from The Dow Chemical Company were added per thousand gallons of base fluid. A delay in the crosslinking of the base fluid of three to four minutes was obtained. The crosslinked fluid was heated to 300° F. in a Fann 50 high-temperature rheometer. By the time the target temperature was attained (approximately 30 minutes), the crosslinked-fluid viscosity had fallen to less than five centipoises (measured at 40 sec$^{-1}$).

EXAMPLE 3

To the base fluid of Example 1, 20 pounds of sodium hydroxide and 60 pounds sodium gluconate per thousand gallons of base fluid were added. Next, 12.5 pounds of boric acid encapsulated with three percent (by weight) "ETHOCEL" ED ethylcellulose were added per thousand gallons of base fluid. A delay in the crosslinking of the base fluid of approximately one hour was obtained.

The crosslinked fluid was heated to 300° F. in a Fann 50 high-temperature rheometer. By the time the target temperature was attained (approximately 30 minutes), the crosslinked-fluid viscosity had fallen to less than five centipoises (measured at 40 sec$^{-1}$).

EXAMPLE 4

To the base fluid of Example 1, 20 pounds of sodium hydroxide and 20 pounds of sodium gluconate per thousand gallons of base fluid were added. Next, 12.5 pounds of boric acid encapsulated with three percent (by weight) "ETHOCEL" ED ethylcellulose were added per thousand gallons of base fluid. A delay in the crosslinking of approximately 25 minutes was obtained. The crosslinked fluid was heated to 300° F. in a Fann 50 high-temperature rheometer. By the time the target temperature was attained (approximately 30 minutes), the crosslinked-fluid viscosity was greater than 200 centipoises (at 40 sec$^{-1}$) and remained so for more than five hours.

EXAMPLE 5

To the base fluid of Example 1, 25 pounds of sodium hydroxide per thousand gallons of base fluid were added to the base fluid. In Case No. 5.1, 10 pounds of sodium gluconate per thousand gallons of base fluid were added to the base fluid. In Case No. 5.2, the sodium-gluconate concentration was increased to 20 pounds per thousand gallons of base fluid. To each fluid, 10 pounds of boric acid encapsulated with three percent (by weight) of "JONCRYL" 98 acrylic latex available from S.C. Johnson & sons, Inc., were added. In Case No. 5.1 crosslinking of the guar was effected in a period of approximately three to four minutes. In Case No. 5.2 crosslinking of the guar was effected in a period of approximately six to seven minutes. The crosslinked fluids were heated to 300° F. in Fann 50 high-temperature rheometers. In each case, by the time the target temperature was attained (approximately 30 minutes), the crosslinked-fluid viscosity was greater than 200 centipoises (at 40 sec$^{-1}$) and remained so for more than five hours.

EXAMPLE 6

To the base fluid of Example 1, 20 pounds of sodium hydroxide and 20 pounds of sodium gluconate per thousand gallons of base fluid were added to the base fluid. Next, 10 pounds of boric acid encapsulated with three percent (by weight) of "JONCRYL" 74 acrylic latex were added. Crosslinking of the guar was effected in a period of approximately seven to eight minutes. The crosslinked fluid was heated to 325° F. in a Fann 50 high-temperature rheometer. By the time the target temperature was attained (approximately 35 minutes), the crosslinked-fluid viscosity was greater than 200 centipoises (at 40 sec$^{-1}$) and remained so for more than three hours.

EXAMPLE 7

To the base fluid of Example 1, 25 pounds of sodium hydroxide and 20 pounds of sodium gluconate per thousand gallons of base fluid were added to the base fluid. Next, 12.5 pounds of boric acid encapsulated with three percent (by weight) of "JONCRYL" 74 acrylic latex were added. Crosslinking of the guar was effected in a period of approximately seven to eight minutes. The crosslinked fluid was heated to 350° F. in a Fann 50 high-temperature rheometer. By the time the target temperature was attained (approximately 40 minutes), the crosslinked-fluid viscosity was greater than 200 centipoises (at 40 sec$^{-1}$) and remained so for more than one hour.

EXAMPLE 8

To the base fluid of Example 1, 25 pounds of sodium hydroxide and 30 pounds of sorbitol per thousand gallons of base fluid were added to the base fluid. Next, 12.5 pounds of boric acid encapsulated with three percent (by weight) of "JONCRYL" 74 acrylic latex were added. Crosslinking of the guar was effected in a period of approximately twenty minutes. The crosslinked fluid was heated to 300° F. in a Fann 50 high-temperature rheometer. By the time the target temperature was attained (approximately 40 minutes), the crosslinked-fluid viscosity was greater than 200 centipoises (at 40 sec$^{-1}$) and remained so for more than five hours.

EXAMPLE 9

To the base fluid of Example 1, 25 pounds of sodium hydroxide and 30 pounds of mannitol per thousand gallons of base fluid were added to the base fluid. Next, 12.5 pounds of boric acid encapsulated with three percent (by weight) of "JONCRYL" 74 acrylic latex were added. Crosslinking of the guar was effected in a period of approximately thirteen to fourteen minutes. The crosslinked fluid was heated to 300° F. in a Fann 50 high-temperature rheometer. By the time the target temperature was attained (approximately 40 minutes), the crosslinked-fluid viscosity was greater than 200 centipoises (at 40 sec$^{-1}$) and remained so for more than five hours.

The encapsulation of the borate, coupled with the polyol agent, allows the controlled release of borate to effect crosslinking at high temperatures and provides for high-temperature fluid stability in a range of up to about 350° F. The present invention permits the formulation of high temperature systems at low temperatures, and the delay permits low pumping friction pressure during the pumping of the fracturing fluid to the formation with the desired crosslinking and its attendant viscosity and rheology benefits being available at high formation temperatures following fluid heat up in the formation.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention we claim:

1. A method of fracturing a subterranean formation comprising the steps of:
   a. providing an aqueous hydrated galactomannan gum fluid,
   b. adding to the hydrated galactomannan gum fluid a base and an organic polyol,
   c. adding an encapsulated soluble boron-containing compound to the hydrated galactomannan gum fluid containing a base and an organic polyol, and
   d. pumping the galactomannan gum fluid with the added components into a wellbore to a subterranean formation at fracturing pressures.

2. The method as set forth in claim 1 further including the step of adding a particulate proppant material prior to the step of pumping.

3. The method as set forth in claim 1 wherein the step of providing a hydrated galactomannan gum comprises providing a hydrated guar solution.

4. The method as set forth in claim 1 wherein the step of providing a hydrated galactomannan gum comprises providing a hydrated hydroxypropyl guar solution.

5. The method as set forth in claim 1 wherein the step of adding a polyol comprises adding sodium gluconate.

* * * * *